atent Number: 4,786,267
Date of Patent: Nov. 22, 1988

United States Patent [19]
Toya et al.

[54] SPARK PLUG

[75] Inventors: Akihiro Toya; Takashi Yamaguchi; Junichi Kagawa; Kazunori Yokota, all of Nagoya, Japan

[73] Assignee: NGK Spark Plug Co., Ltd., Aichi, Japan

[21] Appl. No.: 159,607

[22] Filed: Feb. 24, 1988

Related U.S. Application Data

[62] Division of Ser. No. 863,506, May 15, 1986, Pat. No. 4,743,793.

[30] Foreign Application Priority Data

Mar. 28, 1986 [JP] Japan ................... 61-68545

[51] Int. Cl.$^4$ ............... H01T 21/02; B23K 20/10
[52] U.S. Cl. .................................. 445/7; 228/110
[58] Field of Search .............. 445/7; 228/111, 110; 313/141

[56] References Cited

U.S. PATENT DOCUMENTS

| | | | |
|---|---|---|---|
| 3,854,067 | 12/1974 | Morgan | 313/130 |
| 4,139,140 | 2/1979 | Stockel | 228/110 |
| 4,142,662 | 3/1979 | Holbrook et al. | 228/110 |
| 4,261,085 | 4/1981 | Nishio et al. | 313/143 X |
| 4,414,483 | 11/1983 | Nishio et al. | 313/141 X |
| 4,488,081 | 12/1984 | Kondo et al. | 313/141 |
| 4,540,910 | 9/1985 | Kondo et al. | 313/142 X |
| 4,699,600 | 10/1987 | Kordo | 445/7 |

*Primary Examiner*—Kenneth J. Ramsey
*Attorney, Agent, or Firm*—Wegner & Bretschneider

[57] ABSTRACT

At least one of center and ground electrodes of a spark plug has a thin layer formed by bonding noble metal powder on a discharge-related surface area of the electrode stock of said at least one of said center and ground electrodes in accordance with ultrasonic bonding. Instead of the thin layer, a discharge tip may be formed there by boring a hole in the electrode stock, filling noble metal powder, which has been obtained by coating spherical or flaky metal particles with a corresponding noble metal or noble metal alloy, in the hole and then bonding the thus-filled noble metal powder in accordance with ultrasonic bonding. As a further alternative, a tip made of a noble metal or an alloy thereof may be bonded by ultrasonic bonding or resistance welding in the hole with a layer of metal powder of a metal having good high-temperature erosion resistance or an alloy thereof interposed therebetween. The spark plug enjoys a long operating life.

5 Claims, 10 Drawing Sheets

FIG. 4(a)
FIG. 4(b)
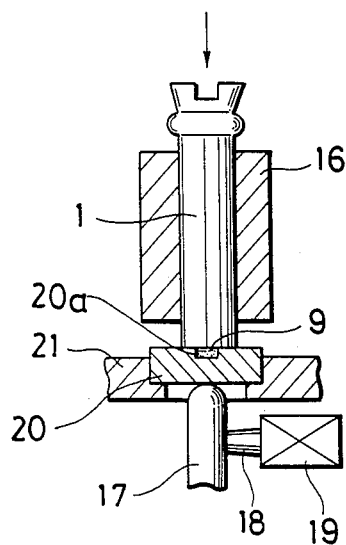
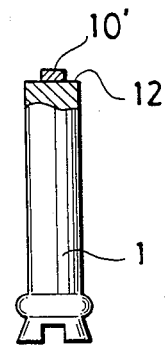
FIG. 5(a)   FIG. 5(b)   FIG. 5(c)   FIG. 5(d)
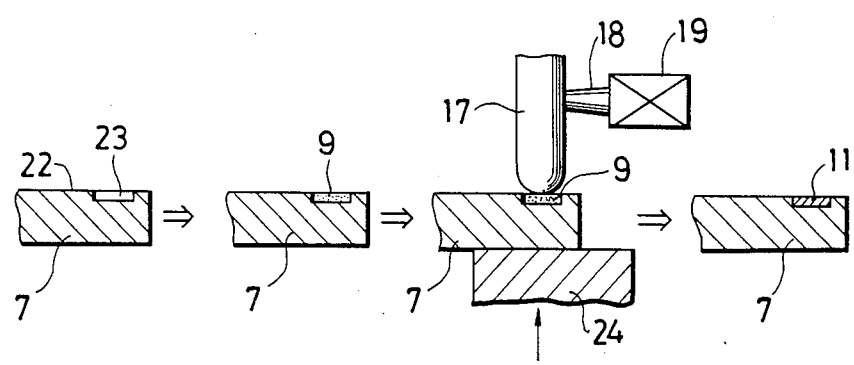

FIG. 18
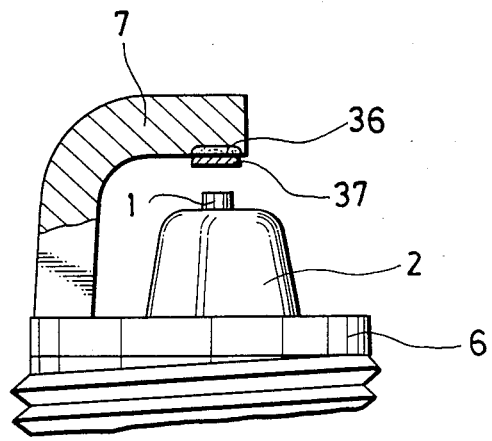
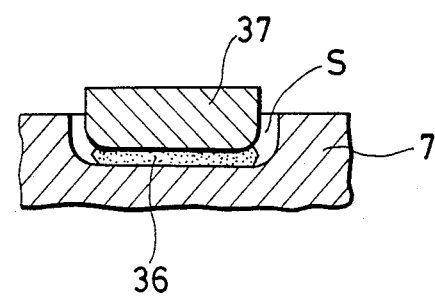
FIG.19(a) PRIOR ART
FIG.19(b)

SPARK PLUG

This application is a divisional of Ser. No. 863,506, filed May 15, 1986, now U.S. Pat. No. 4,743,793.

BACKGROUND OF THE INVENTION (1.) Field of the Invention

This invention relates to spark plugs for use in internal combustion engines, particularly, to spark plugs equipped with electrodes having improved spark wear resistance.

(2.) Description of the Prior Art

In recent years, there is an ever-increasing demand for long-life spark plugs having excellent spark wear resistance with a view toward providing high-performance and maintenance-free internal combustion engines. In order to achieve such prolongation of operating life, it has heretofore been known to improve spark plugs by using a noble metal at discharge-related areas of their center electrodes and ground electrodes made of a heat and erosion resistant metallic material such as a nickel alloy. It has hence been proposed to use pin- or sheet-like tips of a noble metal material such as platinum or a platinum alloy by bonding them in accordance with resistance welding or laser welding. Such pin-like tips however require the noble metal material in a large volume, resulting in a higher manufacturing cost. On the other hand, such sheet-like tips are obtained by stamping circular tips out from blanks of the noble metal material The circular tips are then bonded Many stamped blanks are thus resulted, leading to a yield as low as 30% and a cause for the increased manufacturing cost Noble metal alloys which cannot be readily formed into a pin- or sheet-like shape, for example, Pt-Ir alloys with 25% or more Ir, Rt-Rh alloys with 45% or more Rh, pure Ir and the like have not been used as tips due to their difficult formability although they are expected to improve the spark wear and erosion resistance. Since spark plugs are subjected to a repeated cooling and heating cycle in internal combustion engines, it has been unable to use any noble metal material so long as it tends to develop accelerated cracking and oxidative erosion at the boundary of its bonding with the associated base electrode material by thermal stress caused due to its difference in coefficient of linear expansion from the electrode stock.

SUMMARY OF THE INVENTION

An object of this invention is to improve the drawbacks of the above-described conventional spark plugs and to provide a spark plug which is free from wasting of noble metals so as to permit a significant reduction to the manufacturing cost and is provided with a noble metal layer of good properties at a discharge-related surface area of at least one of center and ground electrodes so as to improve its durability.

Another object of this invention is to increase the bonding strength between each noble metal tip and its associated base electrode material so that a spark plug with improved durability is provided.

In one aspect of this invention, there is thus provided a spark plug equipped with at least one combination of opposed center electrode and ground electrode and adapted to cause a spark discharge to occur between said center and ground electrodes, wherein at least one of said center and ground electrodes has a thin layer formed by bonding noble metal powder on a discharge-related surface area of the electrode stock of said at least one of said center and ground electrodes in accordance with ultrasonic bonding.

The most suitable thickness of the thin noble metal layer may be range from 0.1 mm to 1.0 mm. The particle size of the noble metal powder may range from 10 to 500 μm. Any particle sizes smaller than 10 μm tend to scatter metal powder by vibrations upon its ultrasonic bonding, thereby making its bonding difficult. On the other hand, any particle sizes greater than 500 μm require to increase the stress of ultrasonic bonding, leading to such drawbacks that the electrode stock is susceptible to deformation and the electrode stock must be worked for the correction of its deformation. It is especially noteworthy that the spark wear resistance is insufficient if the thickness of the thin layer is smaller than 0.1 mm but the material is wasted if the thickness exceeds 1.0 mm. In order to enhance the bonding strength between an electrode stock and its associated thin layer or when the thin layer is formed into a multi-layered structure, between each adjacent two layers , it is preferable to form a diffused layer of at least 1 μm thick at their boundary region upon conducting the ultrasonic bonding or by applying a separate heat treatment. Owing to the formation of this diffused layer, it is possible to avoid effectively the separation of the thin layer which would otherwise take place due to the cooling and heating cycle.

According to the first aspect of this invention, noble metal powder is bonded to an electrode stock (a nickel or iron alloy) in accordance with ultrasonic bonding to form a thin layer The thin noble metal layer has been formed by coalescence of metal atoms stimulated by a temperature increase at the boundary region owing to frictional heat. Since it has not been subjected to any conventional fusion bonding such as resistance welding or laser welding, it does not undergo coarsening and fragility unlike cast structures. The bonding region between the electrode stock and the associated thin layer is thus free, even upon repetition of a cooling and heating cycle, from such a danger that it would be broken by occurrence of cracks or the like.

In the second aspect of this invention, there is also provided a spark plug equipped with at least one combination of opposed center electrode and ground electrode and adapted to cause a spark discharge to occur between said center and ground electrodes, wherein at least one of said center and ground electrodes has a discharge tip formed by boring a hole in the electrode stock of said at least one of said center and ground electrodes at a discharge-related surface area of the electrode stock, filling noble metal powder, which has been obtained by coating spherical or flaky metal particles with a corresponding noble metal or noble metal alloy, in the hole and then bonding the thus-filled noble metal powder in accordance with ultrasonic bonding. Owing to the above-described construction, the spark plug operates in the same manner as that defined in the first aspect of this invention. According to the second aspect of this invention, it is possible to manufacture spark plugs at a higher yield compared with the use of conventional stamped noble metal tips. The wasting of a noble metal material can be avoided further when the noble metal material is coated with a base metal to form the noble metal powder.

In a further aspect of this invention, there is also provided a spark plug equipped with at least one combination of opposed center electrode and ground electrode and adapted to cause a spark discharge to occur between said center and ground electrodes, wherein at least one of said center and ground electrodes has a discharge tip formed by boring a hole in the electrode stock of said at least one of said center and ground electrodes at a discharge-related surface area of the electrode stock and then bonding a tip made of a noble metal or an alloy thereof in the hole with a layer of metal powder of a metal having good high-temperature erosion resistance or an alloy thereof interposed therebetween in accordance with ultrasonic bonding or resistance welding Owing to the above-described structure, the thermal stress between the electrode stock and noble metal tip is relaxed and their bonding is good. Furthermore, the tip is bonded to the base material by the interposition of the metal or its alloy having good high-temperature erosion resistance. There is thus no danger that the bonding would be broken due to occurrence of cracks by a cooling and heating cycle.

The above and other objects, features and advantages of this invention will become apparent from the following description of the invention and appended claims, taken in conjunction with the accompanying drawings.

BRIEF DESCRIPTION OF THE DRAWINGS

In the accompanying drawings:

FIGS. 4(a) and 4(b) illustrate another production process of the center electrode of the spark plug of FIG. 1;

FIGS. 5(a) through 5(d) depict a production process of the ground electrode of the spark plug of FIG. 1;

FIGS. 9 through 16(c) illustrate a spark plug according to the aspect of this invention, namely;

FIGS. 9 and 10 are fragmentary, cross-sectional views of examples of the center electrode of the spark plug according to the second aspect;

FIGS. 13 through 15 are fragmentary front elevations of examples of spark plugs according to the second aspect of this invention, in each of which each ground electrode is provided with a noble metal tip;

FIGS. 16(a) through 16(c) depicts a production process of each of the ground electrodes shown respectively in FIGS. 13 through 15;

FIGS. 17(a) through 19(b) show the third aspect of this invention, namely;

FIGS. 17(a) through 17(d) illustrates a production process of a ground electrode according to the third aspect of invention;

FIG. 18 shows a cross-sectional fragmentary view of a spark plug equipped with a ground electrode according to the third aspect of this invention; and FIGS. 19(a) and 19(b) illustrate test results of a conventional ground electrode and those of a ground electrode according to the third aspect of this invention.

DETAILED DESCRIPTION OF THE INVENTION AND PREFERRED EMBODIMENTS

Figure 1:
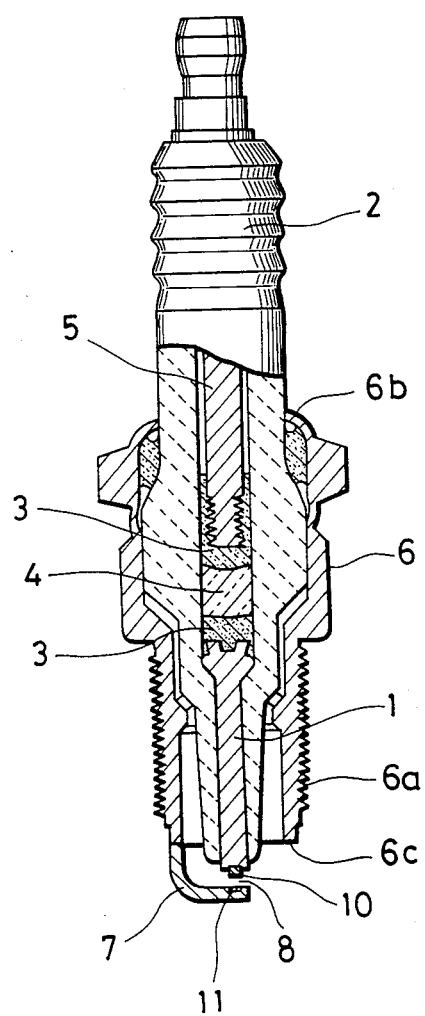
FIG. 1 is a fragmentary cross-sectional view of a spark plug according to the first aspect of this invention.
Figure 2:
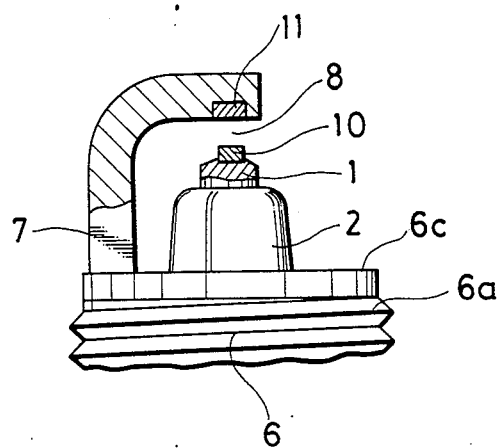
FIG. 2 is a fragmentary enlarged cross-sectional view of the spark plug of FIG. 1.

Referring first to FIGS. 1 and 2 which illustrate the spark plug according to the first aspect of this invention, numeral 1 indicates a center electrode made of Ni-Si-Mn-Cr, Ni-Cr-Fe (Inconel) or the like alloy having good heat and erosion resistance. In order to increase its thermal conductivity, Cu or the like is usually enclosed within the center electrode 1. Designated at numeral 2 is an insulator made of high-alumina porcelain or the like. The insulator 2 defines an axially-extending bore, in which the center electrode 1 is sealed integrally with a terminal electrode 5 by way of electrically-conductive glass seal 3 and a resistor 4. Numeral 6 indicates a metal shell which is threaded at numeral 6a for engagement in an internal combustion engine. The metal shell 6 defines an internal cavity, in which the insulator 2 is fit. The metal shell 6 and insulator 2 are fixed together, for example, by caulking the former along its upper end edge 6b against the latter. Designated at numeral 7 is a ground electrode bonded to an annular end face 6c of the metal shell 6. A spark gap 8 is defined between the inner end surface of the ground electrode 7 and the end surface of the center electrode 1.

Figures 3A, 3B, 3C, 3D, 3E, 3F:
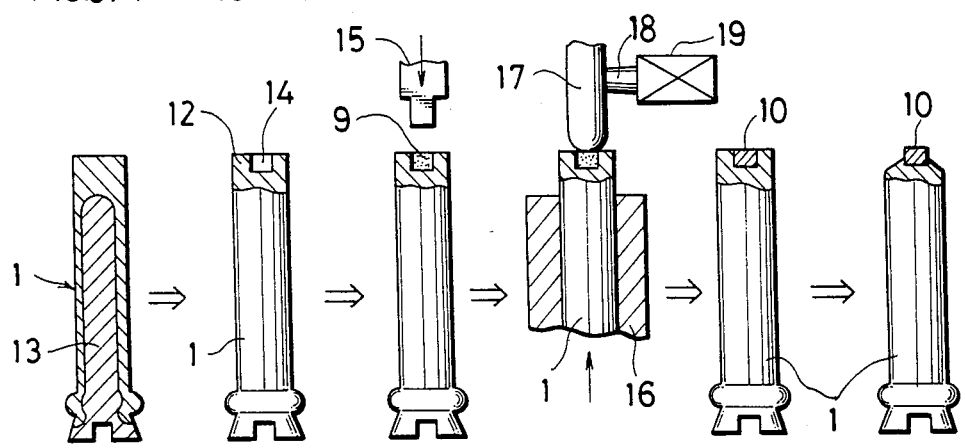
FIGS. 3(a) through 3(f) show a production process of the center electrode of the spark plug of FIG. 1.

According to the present invention, thin noble metal layers 10,11 are formed on or in the end surface of the center electrode (1) and a discharge-related area of the inner end surface of the ground electrode 7 by bonding noble metal powder 9 [see, FIG. 3(c) for example] to the end surface and discharge-related area in accordance with ultrasonic bonding. As exemplary material useful as the noble metal powder 9 in the formation of the thin noble metal layers 10,11, may be mentioned pure noble metals such as Pt, Pd, Ir, Ru, Rh and Au; alloys of these noble metals (may hereinafter be called "noble metal alloys" for the sake of clarification) such as Pt-Pd, Pt-Ir, Pt-Ru, Pt-Rh, Pt-Ir-Pd, Pt-Ir-Ru, Pt-Ir-Pd-Ru and Au-Pd alloys; alloyed noble metal materials obtained by adding Ni, WSi or W to the above noble metals or noble metal alloys, including Pt alloys such as Pt-Ni, Pt-W, Pt-WSi and Pt-Ir-Ni, Pd alloys such as Pd-Ni, Pd-W, Pd-WSi and Pd-Pt-Ni, Ir alloys such as Ir-Ni, Ir-W, Ir-WSi and Ir-Pd-Ni, Ru alloys such as Ru-Ni, Ru-W, Ru-WSi and Ru-Pt-Ni, Rh alloys such as Rh-Ni, Rh-WSi and Rh-Pt-Ni and Au alloys such as Au-Ni, Au-W and Au-WSi; and mixtures consisting each of at least two of the above noble metals, noble metal alloys and alloyed noble metal materials. Besides, all other Pt-base alloys may also be used in the practice of this invention.

A description will next be made of the formation of the thin noble metal layers. FIG. 3(a) to FIG. 3(f) illustrate various steps for forming the thin noble metal layer 10 in the end surface 12 of a stock for the center electrode 1 (may hereinafter be called "center electrode stock 1" or merely "electrode stock 1" for the sake of brevity). Referring first to FIG. 3(a), there is illustrated the base electrode stock 1 with a core 13, which is made of a material having high thermal conductivity such as Cu, enclosed by plastic working or the like. A hole 14 of 0.5–1.5 mm across and 0.1–1.0 mm deep is formed in the end surface 12 of the electrode stock 1 [see, FIG. 3(b)]. Here, it should be borne in mind that the term "hole" or "holes" as used herein does not mean through-hole or through-holes. Referring next to FIG. 3(c), the noble metal powder 9, for example, powder made of a Pt-Ir(20%) alloy and having a particle size in a range of 10-500 μm is filled in the hole 14 and is then pressed by a plunger 15 in a direction indicated by an arrow so as to increase the packed density. Thereafter, as shown in FIG. 3(d), the electrode stock 1 is fixed in place on a support 16, the lower extremity of a resonant stick 17 of an ultrasonic bonding machine is downwardly brought into contact with the powder 9, and a static pressure is also applied upwardly as indicated by an arrow. To the resonant stick 17, a metal horn 18 is then connected in a direction perpendicular radially to the resonant stick 17. By means of an oscillator 19, the powder is ultrasonically bonded and as depicted in FIG. 3(e), the thin layer 10 is formed in the hole 14. The end surface of the electrode is then cut into a desired shape, for example, in such a manner that the side wall of the thin layer 10 is partly exposed [see, FIG. 3(f)] or the electrode is merely tapered at an end portion thereof to form an non-exposed type, thereby forming the center electrode.

Another example of the production process of the center electrode is shown in FIGS. 4(a) and 4(b). As is understood from FIG. 4(a), a hole 20a is formed in a tip 20 of the ultrasonic bonding machine instead of forming a hole in the end surface of the center electrode stock 1. The tip 20 is then fixed in place on a support 21 and the noble metal powder 9 is filled and pressed in the hole 20a. After fixing the electrode stock 1 on the support 16 with its free end down, ultrasonic bonding is applied from the lower side in the same manner as that described above by way of the resonant stick 17 and metal horn 18. As a result, a thin noble metal layer 10' is formed in a state exposed from the end surface 12 of the electrode stock 1 as depicted in FIG. 4(b).

Figures 6A, 6B:
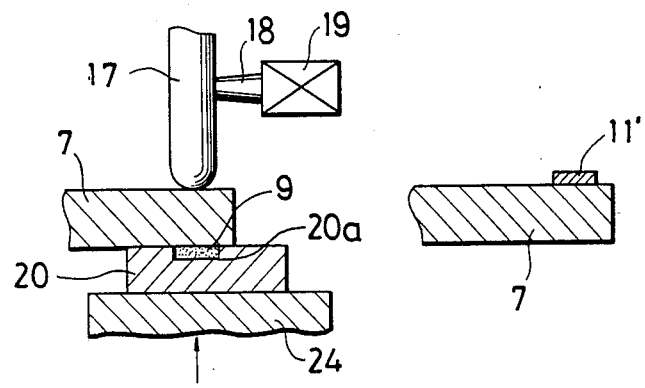
FIGS. 6(a) and 6(b) show another production process of the ground electrode of the spark plug of FIG. 1.

FIGS. 5(a) through 5(d) and FIGS. 6(a) and 6(b) illustrate examples for providing the ground electrode 7 with the thin noble metal layer 11. In FIGS. 5(a) through 5(d), an hole 23 is formed in the inner end surface 22 of a stock for the ground electrode 7 (may hereinafter be called "ground electrode stock 7" or merely "electrode stock 7" for the sake of brevity) [see, FIG. 5(a) in particular]. The stock is made of a Ni-Cr-Fe alloy. The noble metal powder 9 is then filled and pressed in the hole 23 [FIG. 5(b)]. As illustrated in FIG. 5(c), the electrode stock 7 is mounted on a support table 24 and the noble metal powder 9 is then bonded by means of the resonant stick 17, metal horn 18 and oscillator 19 of the ultrasonic bonding machine so that the thin noble metal layer 11 is formed in the hole 23 of the electrode stock 7 as shown in FIG. 5(d). Turning next to FIGS. 6(a) and 6(b), instead of forming the hole in the ground electrode stock 7, the hole 20a is formed in the tip 20 of the ultrasonic bonding machine and the resultant tip 20 is then mounted on the support table 24 as depicted in FIG. 6(a). After filling and pressing the noble metal powder 9 in the hole 20a, the noble metal powder 9 is bonded in accordance with ultrasonic bonding to form a thin noble metal layer 11' exposed from the inner end surface of the ground electrode 7 as shown in FIG. 6(b). As illustrated in FIG. 2, these ground electrodes are each bonded or welded to the annular end face 6c of the metal shell 6 by resistance welding and then bent so that the ground electrode 7 is caused to extend to a point opposite to the thin noble metal layer 10 of the center electrode 1 to form the spark gap 8. Incidentally, the hole 23 of the ground electrode 7 and the thin layers 11,11' may not necessarily limited only to the circular shapes and they may alternatively be formed into square shapes.

Figure 7:
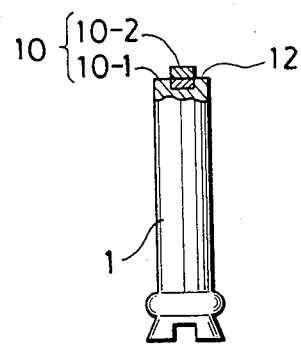
FIGS. 7 and 8 are fragmentary cross-sectional views showing further examples of the core electrode and ground electrode of this invention respectively.
Figure 8:
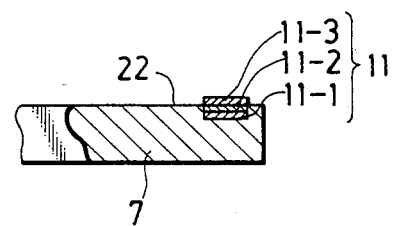

FIGS. 7 and 8 illustrate still other examples of thin noble metal layer according to the present invention. The thin noble metal layers 10,11, which are formed respectively on the end surface 12 of the center electrode 1 and the inner end surface 22 of the ground electrode 7, are formed respectively into multi-layered structures of two layers 10-1,10-2 and three layers 11-1,11-2,11-3 by superposing dissimilar noble metal powders as the noble metal powder 9. They may each be formed by a production process similar to those employed to form the electrodes of FIG. 3(a) through FIG. 6(b). For example, a Pt-Ni alloy layer 10-1 having good bonding properties may be provided on the side of the electrode stock while a Pt-Ir alloy layer 10-2 featuring excellent spark wear resistance may be provided on the side of the discharge-related surface area. In this manner, it is possible to maintain a stronger bonding force between an electrode stock and its associated thin noble metal layer.

In each of the examples illustrated in FIGS. 3(a) through 8, it is desirable for an increased bonding force to form a diffused layer of 1μ thick or more at the boundary between each electrode stock and its associated thin noble metal layer or at the boundary between each two adjacent layers of each of the multi-layered structures upon effecting the ultrasonic bonding. As a matter of fact, a diffused layer of 2-5 μm thick is formed upon ultrasonic bonding. This diffused layer can be rendered still thicker by applying a heat treatment thereto subsequent to the ultrasonic bonding.

Durability of thin noble metal layers formed in accordance with this invention will next be described. An experiment was conducted in the following manner. There were provided Invention Sample Nos. 1-18, which had been obtained by bonding various noble metal power samples (particle size: 20-300 μm) to electrode stocks of a Ni-Cr-Fe alloy to a thin layer thickness of 0.3 mm in accordance with ultrasonic bonding, and as a conventional control product, Sample No. 19 obtained by welding a 0.3-mm thick tip of a Pt-Ir alloy in accordance with resistance welding. Those samples were repeatedly subjected 1,000 times to a heating and cooling cycle which consisted of 3 minutes of burner heating (1,000° C. max.) and 3 minutes of natural cooling (300° C. min.). Thereafter, each sample was inspected. As will be understood from results given in Table 1, the invention samples were all good.

TABLE I

| Sample No. | Material of noble metal powder for thin layer | | | Test results* (after 1,000 repetitions) |
|---|---|---|---|---|
| | 1st layer (on the stock side) | 2nd layer | 3rd layer | |
| 1 | Pt | | | ○ |
| 2 | Pt—Ir(25)** | | | ○ |
| 3 | Pt—Ni(10) | | | ○ |
| 4 | Pt—WSi(5) | | | ○ |
| 5 | Ir | | | ○ |
| 6 | Ir—Ni(10) | | | ○ |
| 7 | Pt—Pd(20) | | | ○ |
| 8 | Pt—Ru(10) | | | ○ |
| 9 | Pt—Rh(45) | | | △ |
| 10 | Pt—Ir(10)-Ru(5) | | | ○ |
| 11 | Pt—Pd(10)-Ni(5) | | | ○ |
| 12 | Pt 50 wt. % Pt—Ir(20) 50 wt. % | | | ○ |
| 13 | Pt—Ir(20) | | | ○ |

TABLE I-continued

| Sample No. | Material of noble metal powder for thin layer | | | Test results* (after 1,000 repetitions) |
|---|---|---|---|---|
| | 1st layer (on the stock side) | 2nd layer | 3rd layer | |
| | 50 wt. % Pt—Ru(5) 50 wt. % | | | |
| 14 | Pt—Ni(20) | Pt—Ir(20) | | O |
| 15 | Pt—Pd(10) | Pt—Ir(20 | | O |
| 16 | Pt—Ni(30) | Pt—WSi(5) | | O |
| 17 | Pt—Ni(30) | Pt—Ni(10) | Pt—Ir(20) | O |
| 18 | Pt—Pd(10)-Ni(5) | Pt—Ni(5) | Pt—WSi(5) | O |
| 19*** | Pt—Ir(25) | | | X |

*O: Good; Δ: Small cracks; X: Large cracks.
**Figures in parentheses () indicate contents by wt. %.
***Control Besides, invention Sample Nos. 2, 3, 6, 14 and 17 were each subjected to a durability test for 100 hours under 5500 rpm×4/4 load by using a 4-cycle, 2,000 c.c. engine. No abnormality was observed on those invention samples.

In the first aspect of this invention, owing to the formation of thin noble metal films by bonding their corresponding noble metal powder to electrode stocks in accordance with ultrasonic bonding, the thin noble metal films can be easily united with their corresponding electrode stocks with a high yield and unlike conventional spark plugs obtained by fusion-bonding such noble metal powder, the electrode stocks are free from embrittlement and can maintain high bonding forces. Moreover, ultrasonic bonding allows to use materials which have been considered to be unsuitable as materials for thin metal layers. The first aspect of this invention has hence brought about such an advantage that long-life spark plugs equipped with thin noble metal layers excellent in such properties as spark wear resistance and erosion resistance can be provided economically.

Figure 9:
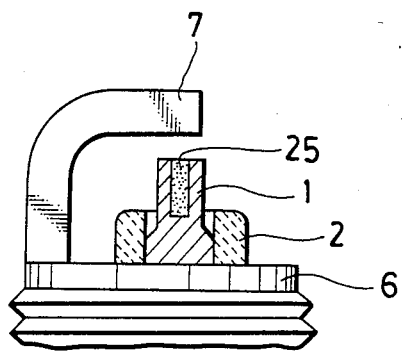
Figures 11A, 11B, 11C:
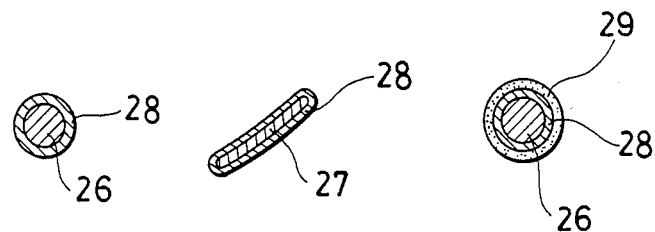
FIGS. 11(a) through 11(c) a cross-sectional views of metal particles.

Turning next to the second aspect of this invention, FIG. 9 illustrates a spark plug equipped with the center electrode 1 embodying the second aspect of this invention. Designated at numeral 25 is a discharge tip according to the second aspect of this invention. The discharge tip 25 has been formed by bonding noble metal powder in accordance with ultrasonic bonding. As is shown in detail in FIGS. 11(a) through 11(c), the noble metal powder is composed of spherical metal particles 26 or flaky metal particles 27 having a particle size of 1–30 μm and coated with a noble metal 28 to a thickness of 0.5–30 μm. In FIG. 11(c), the coating has a multi-layered structure composed of two coating layers 28,29 applied one over the other. Like reference numerals indicate like elements of structure in the above-described examples according to the first aspect of this invention. Description of these elements of structure is therefore omitted.

A description will next be made of the outline of an illustrative production process of the metal alloy powder which is useful in the production of the center electrode 1. Namely, Rh, Pt, Ir, Pd or Ru per se or a Rh-Pt, Rh-Ir, Rh-Pd, Pt-Ir, Pt-Pd, Ir-Pd, Rh-Pt-Pd, Rh-Ir-Pd, Rh-Ir-Pt or Pt-Ir-Pd alloy is coated to a thickness of 0.5–30 μm on spherical or flaky particles (particle size: 1–30 μm) of Fe, Ni, W, Mo, Ru, Cr, Co, V, Ti, Si, Zr, Nb, Ta, Pt, Ir, Pd, Re, Ru, Rh or the like [FIGS. 11(a) and 11(b)]. Alternatively, the above-described metal particles and the above-mentioned coating noble metal or its alloy may be formulated together in accordance with the mechanochemical process or one or more alloys may be coated in a multi-layered form on the above-mentioned particles to obtain powder 30 shown in FIG. 12(c) [FIG. 11(c)]. An exemplary production process of the center electrode 1 is now described with reference to FIGS. 12(a) through 12(e). First of all, the stock 1 shown in FIG. 12(a) is formed into a cylindrical configuration from an alloy such as Ni-Cu-Si-Mn, Ni-Cu-Fe or Ni-Cr-Fe and if needed, the core 13 made of a material having good thermal conductivity such as Cu or Ag is fit centrally in the stock 1 so that the core 13 is clad by the stock 1.

Figures 12A, 12B, 12C, 12D, 12E, 12F:
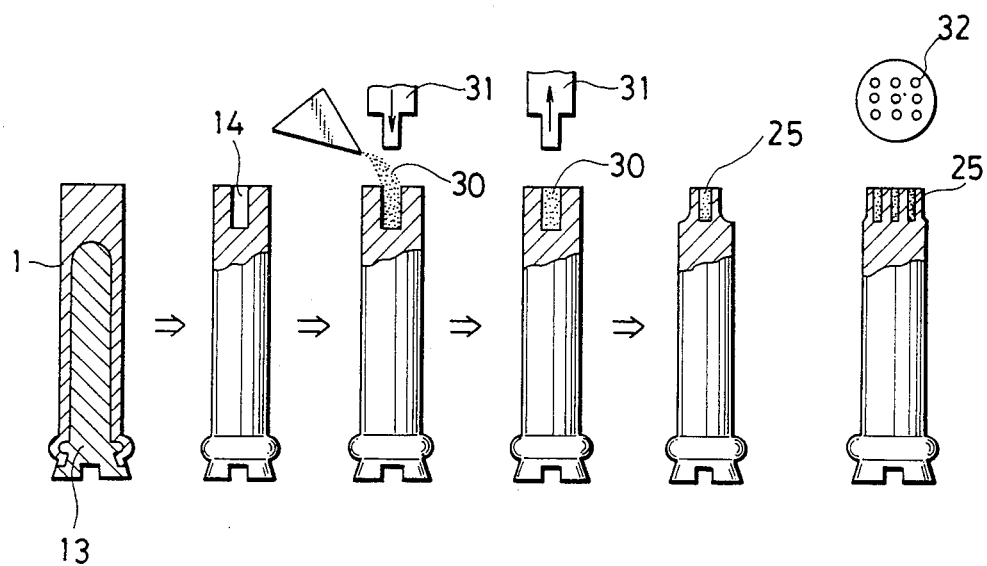
FIGS. 12(a) through 12(e) illustrate a production process of the center electrode of FIG. 9
FIG. 12(f) depicts the center elect rode of FIG. 10 in the same as in 12(e)

The hole 14 is then formed to a depth of 0.2 mm–1.0 mm in the top surface of the center electrode stock 1 [FIG. 12(b)] and the noble metal powder 30 prepared above is filled in the hole 14. The powder 30 is then pressed in the hole 14 by a press 31 [FIGS. 12(d) and 12(d)]. Similar to the process shown in FIGS. 3(a) through 3(f), the tip 25 is formed by ultrasonic bonding.

The thus-obtained central electrode 1 is thereafter cut suitably at the peripheral end wall or end surface thereof [FIG. 12(e)], followed by its assembly in the insulator 2 to complete a spark plug.

Figure 10:
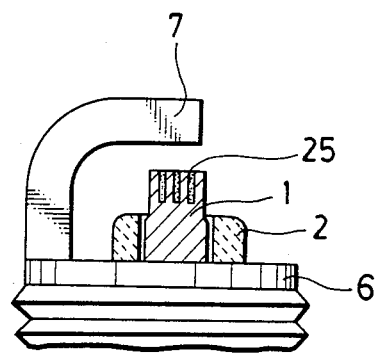

As illustrated in FIG. 12(f), it is also feasible to form a plurality of tips by drilling the same number of holes 32 in the top surface of a center electrode stock and then filling and ultrasonically bonding the noble metal powder 30 in the holes in accordance with the steps shown in FIGS. 12(c) and 12(d) respectively. A spark plug equipped with this center electrode 1 is depicted in FIG. 10.

In addition, FIGS. 13 through 16(c) illustrate examples of the ground electrode 7 to which the noble metal powder 30 has been bonded. Namely, the noble metal powder 30 is bonded as tips in accordance with steps depicted respectively in FIGS. 16(a) through 16(c). In FIG. 16(a), a hole 23 of 0.6–1.5 mm across and 0.05 mm–1.0 mm deep is formed in a straight-angled wire made of a heat-resistant alloy such as Ni-Cr-Si-Mn or Ni-Cr-Fe at a discharge-related area. The above-described metal powder 30 is then filled in the hole 23. The powder 30 is pressed by a press 34 in a direction indicated by an arrow in FIG. 16(b), so that the packed density of the powder 30 is increased. Upon filling the powder 30, ultrasonic bonding may be applied. Depending on bonding conditions, its bonding can be achieved to such a high level that the subsequent heat treatment can be omitted.

Figure 16A:
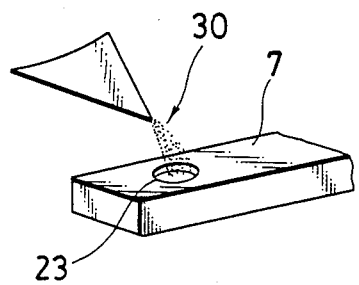
Figure 16B:
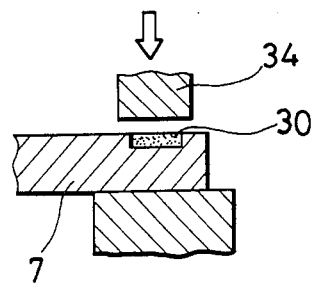
Figure 16C:
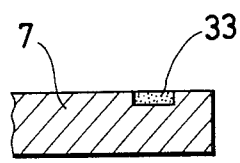

If needed, the above-described wire-like stock 7 may be subjected to a heat treatment at 900°–1400° C. in vacuum or an inert gas so that a noble metal tip 33 having good bonding properties to the heat-resistant alloy of the stock 7 may be formed [FIG. 16(c)]. The thus-obtained electrode stock 7 is welded to the annular end face 6c of the metal shell 6 in such a manner that the tip 33 is positioned in the spark gap.

Figure 13:
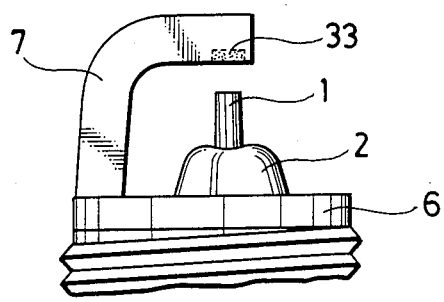
Figure 14:
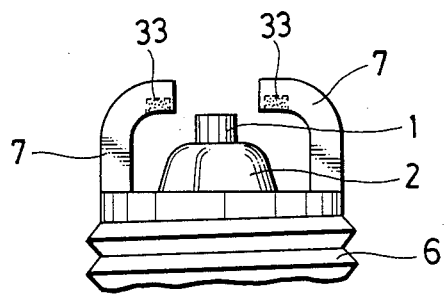
Figure 15:
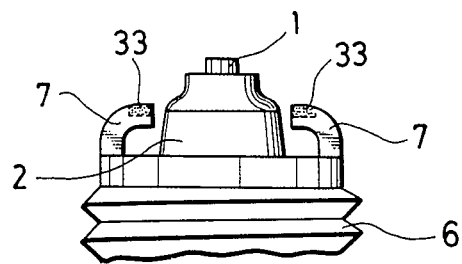

FIGS. 13 through 15 illustrate the above-described electrode stocks 7 attached to their associated metal shells 6. In FIG. 13, the ground electrode 7 is located in opposition to the end surface of the center electrode 1. FIGS. 14 and 15 show other examples, in each of which two ground electrodes 7 are provided facing the peripheral end wall of the center electrode 1 or insulator 2. In each of these examples, it is more preferable from the viewpoint of improved durability to cut off the end face of the stock so that the noble metal tip 33 of the ground electrode 7 is located on the end face.

According to the second aspect of this invention, a powder alloy which has been subjected to the above-described special treatment is sintered and bonded as tips to stocks. The second aspect of this invention can therefore bring about an advantage that the tips can be united to their associated stocks with a high yield. It can also brought about another advantage that spark plugs equipped with tips superb in properties such as spark wear resistance and metal erosion resistance can be obtained since the second aspect allows to use materials which have been considered to be unsuitable for tips. In particular, the second aspect of this invention requires the expensive noble metal in a smaller volume and can hence provide spark plugs at a lower manufacturing cost, because it uses the noble metal to coat particles of a base material.

A description will now be made of the third aspect of this invention. The outline of a production process according to the third aspect is illustrated in FIGS. 17(a) through 17(d). Although these drawings show the ground electrode, the third aspect of this invention can obviously be applied to the discharge area of a center electrode. The electrode stock is indicated at numeral 7, which is made of INC600. Numeral 23 indicates the hole formed in the stock 7 at a position close to the free end of the stock 7 and having a diameter of 1.2 mm and depth (t) of 0.05–2 mm. Designated at numeral 35 is a drill. Numeral 36 indicates metal powder filled suitably in the hole 23. In the illustrated example, the metal powder is Pt-20Ir (added with 20% of Ir) having a particle size of 1–20 μm. There are also shown a noble metal tip 37 made of Pt-20Ir and having a diameter of 1.2 mm and thickness of 0.4 mm, a plunger 38 for compacting the above-filled metal powder, and electrode plates 39 for holding the stock 7 and tip 37 with the layer of the metal powder 36 interposed therebetween so as to apply ultrasonic bonding or resistance welding.

Figure 17A:
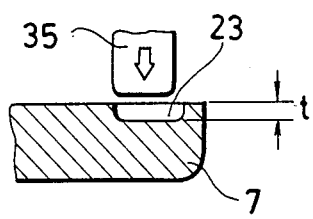
Figure 17B:
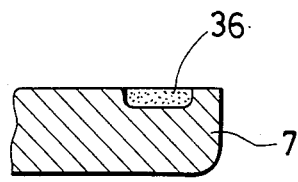
Figure 17C:
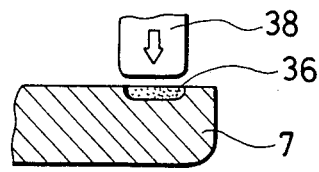
Figure 17D:
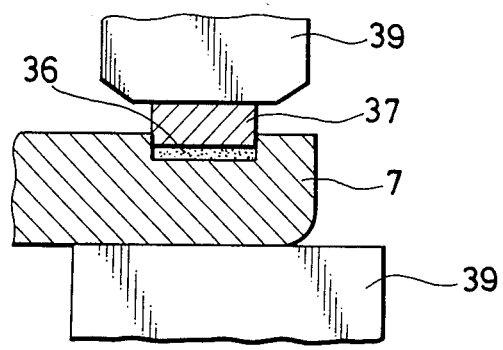

First of all, the hole 23 is formed by the drill 35 in the stock 7 of INC 600 [FIG. 17(a)], the Pt-20Ir powder 36 having the particle size of 1–20 μm is filled in the hole 23 [FIG. 17(b)], and after pressing and compacting the thus-filled powder 36 by means of the plunger 38, the noble metal tip 37 made of Pt-20Ir is mounted on the thus-compacted powder 36. Thereafter, the stock 7 and tip 37 with the powder 36 interposed therebetween are held between the electrode plates 39,39 and a current is caused to pass between the electrodes 39,39 to conduct resistance welding. Owing to the current, the layer of the powder 36 is fused so that the tip 37 is bonded to the stock 7. As illustrated in FIG. 18, the stock 7 is attached to the end face of the metal shell 6 in the same manner as that described above. Although the above described example is directed to resistance welding, ultrasonic bonding is also applicable as mentioned above.

The state of bonding of the noble metal tip 37 formed in the above manner was tested by repeating 500 times a heating and cooling cycle which consisted of 3 minutes of heating (1,000θ max.) and 3 minutes of natural cooling (300° C. min.). As illustrated in FIG. 19(a), the bonding gap s became relatively large and the bonding area became smaller where Pt-20Ir was bonded directly as the tip 37 to the electrode stock 7 as in the prior art. When a 0.05–0.2 mm thick layer of Pt-20Ir powder having a particle size of 1–20 μm was interposed as in the above example of the third aspect of this invention, it was found that the bonding area remained large and the gap s remained small as readily envisaged from FIG. 19(b).

The thickness of the above powder layer may suitably range from 0.05 to 0.20 mm. The particle size of its powder may desirably range from 1 to 20 μm. If powder having a particle size smaller than 1 μm should be used, the powder is caused to scatter by vibrations upon its bonding, thereby making it difficult to form an intermediate layer which is expected to relax stress. On the other hand, any particle sizes greater than 20 μm cannot assure any sufficient bonding strength as an intermediate layer and result in lots of air trapped in the layer. This air expands at an elevated temperature so that the bonding strength is reduced. As the material of the powder, powder of a material similar to the material of the noble metal tip is preferred. It is particularly preferred to use a material having a coefficient of linear expansion between the metal tip and the stock and enjoying oxidation resistance even at temperatures above 1,000° C., for example, Pt, Pd, In or Ru per se, an alloy such as Pt-Ir, Pt-Pd, Pt-Rh or Pt-Ru, or as a material other than noble metals, Ni-Cr-Fe alloy (Inconel), SUS310 (20Ni-35Cr) or the like.

The third aspect of this invention can bring about an excellent effect in improving the durability of a spark plug to such an extent that its discharge-related areas are not damaged unlike conventional spark plugs even when subjected to a severe cooling and heating cycles.

Having now fully described the invention, it will be apparent to one of ordinary skill in the art that many changes and modifications can be made thereto without departing from the spirit or scope of the invention as set forth herein.

We claim:

1. A method of producing a spark plug having at least one center electrode and at least one ground electrode spaced apart from and opposed thereto and defining a gap therebetween for causing a spark discharge to occur across said gap, comprising the steps of:
   providing noble metal powder;
   applying said powder to a discharge-related surface area or at least one of said center and ground electrodes; and thereafter
   bonding said noble metal powder ultrasonically into said at least one of said center and ground electrodes.

2. A method of producing a spark plug as claimed in claim 1, further comprising the steps of:
   boring a groove portion in an electrode stock for said at least one of said center and ground electrodes; and thereafter
   filling said powder into said groove portion.

3. A method of producing a spark plug as claimed in claim 1, further comprising the steps of:
   providing a die;
   boring a groove portion in said die;
   filling and pressing said powder into said groove portion;
   bringing said discharge-related surface into contact with said powder; and thereafter
   bonding said powder ultrasonically thereon.

4. A method of producing a spark plug as claimed in claim 1, wherein said noble metal powder comprises spherical or flaky metal particles coated with a corresponding noble metal, or noble metal alloy.

5. A spark plug as produced by the process of claim 1.

* * * * *